July 18, 1933. R. S. LANGDON 1,918,409
BOOM YARDER
Filed July 2, 1931 3 Sheets-Sheet 1

INVENTOR
Robert S. Langdon
BY
ATTORNEY

July 18, 1933. R. S. LANGDON 1,918,409
BOOM YARDER
Filed July 2, 1931 3 Sheets-Sheet 2
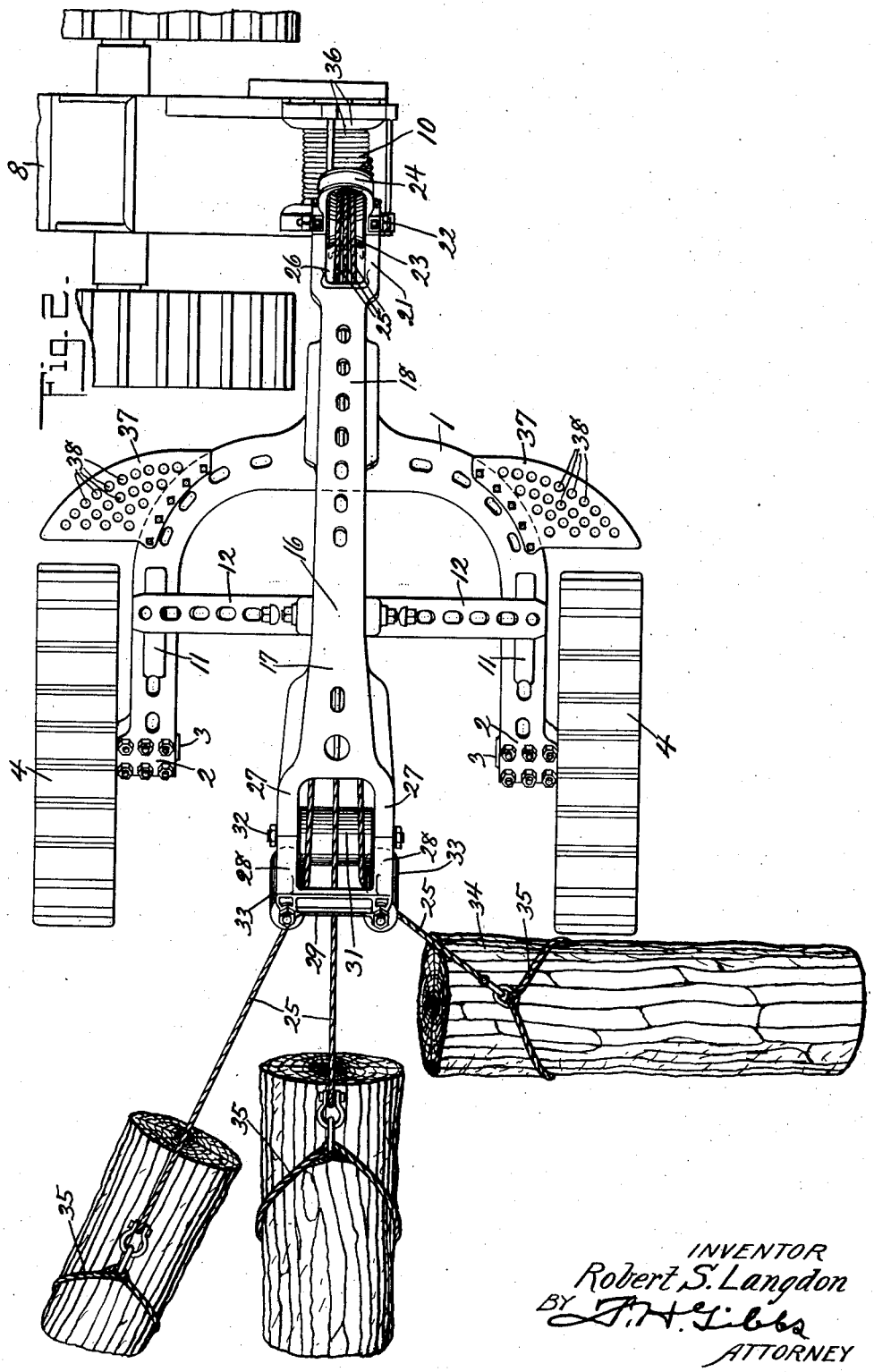
INVENTOR
Robert S. Langdon
BY
ATTORNEY July 18, 1933.  R. S. LANGDON  1,918,409
BOOM YARDER
Filed July 2, 1931   3 Sheets-Sheet 3
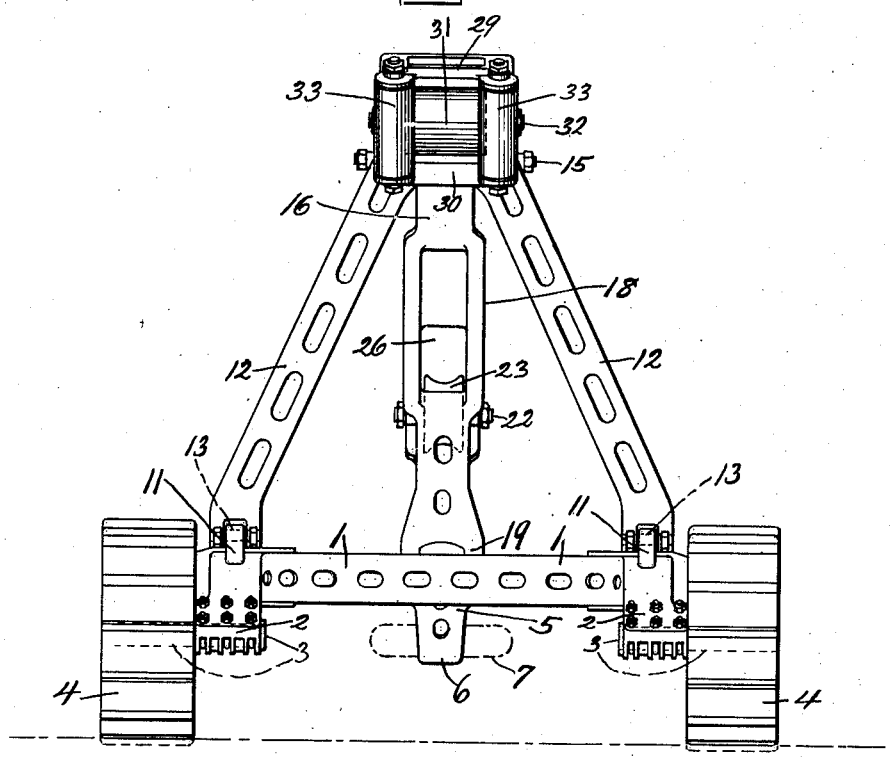
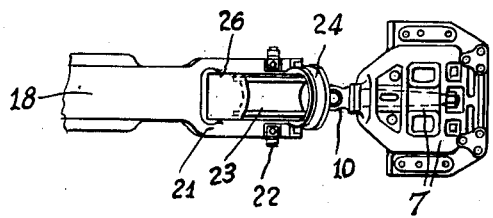
INVENTOR
Robert S. Langdon
BY
ATTORNEY Patented July 18, 1933

1,918,409

UNITED STATES PATENT OFFICE

ROBERT S. LANGDON, OF SUMNER, WASHINGTON, ASSIGNOR TO PACIFIC CAR AND FOUNDRY COMPANY, OF SEATTLE, WASHINGTON, A CORPORATION OF WASHINGTON

BOOM YARDER

Application filed July 2, 1931. Serial No. 548,364.

This invention relates generally to material handling apparatus and more particularly to logging equipment in the form of an improved trailer attachable to a tractor for bunching and moving logs in the woods, the construction of the trailer and its relation to the tractor being such that with the disclosure herein a very high degree of flexibility of operation is obtained combined with stability, safeness, durability and simplicity of construction.

A large variety of constructions and arrangements have heretofore been proposed and used for logging, but they are possessed of certain undesirable limitations. Some of the prior devices are in the form of a self-contained unit, such for example, as a tractor having the entire log handling apparatus mounted thereon to form a single unit. Such a device is appreciably lacking in the desired degree of flexibility which is most essential in equipment of this kind. Other types include the so called arch frame which is a form of trailer connected to a tractor, while there is also, of course, the older method of using a donkey engine with cable lines running out therefrom. Of these three forms, among others, the arch type of trailer has come into more recent use, but its somewhat limited degree of flexibility practically prohibits its use in certain forests, particularly those where it is necessary to protect seed trees.

It is one object of this invention to provide an improved yarder for attachment to a tractor whereby a high degree of efficient and flexible operation may be had so as, not only to avoid destruction of seed trees, but also to render it easier to bunch logs and move them through the woods and in general to provide a wider range of usefulness for the trailer type of yarder.

In addition to limited flexibility in the arch yarder, difficulty is also sometimes experienced when it is loaded due to a tendency to lift the rear end of the tractor to which it is connected thereby reducing the driving contact of the tractor wheels with the ground whether the wheels are of the crawler or round types. In the specific form of yarder herein shown this difficulty is eliminated or at least reduced to a minimum notwithstanding that the logs are carried by an improved boom yarder which might be considered to aggravate this condition rather than reduce it. However, this improved yarder embodies a boom in combination with a supporting structure so arranged that stability is obtained along with an ease and efficiency of operation of which the arch yarder is incapable.

In a more specific aspect of the invention this improved operation is facilitated by the provision of a relatively simple reach frame, the tongue of which is pivotally connected to the tractor, preferably immediately below the winding drum carried by the tractor, while the outer ends of the U-shaped portion of the reach are pivotally carried by wheels preferably of the endless track or crawler type although it will of course be understood that depending upon the conditions of operation circular wheels might in some cases be employed. Mounted upon the reach frame is a longitudinally disposed diagonal frame, one of its ends constituting a boom while its other end serves not only as a connection to the reach frame, but also to guide the cable line or lines to the winding drum on the tractor, this guiding means being so arranged with respect thereto that the tractor may be turned at substantially right angles to the yarder without affecting the operation of the winding mechanism or in any way lessening the effectiveness of the equipment, or in other words, the normal winding operation and the normal relation of the cable to the winding drum is maintained substantially constant for any angular relation between the tractor and yarder. To permit complete flexibility of the equipment such for instance as to permit logs to be drawn in at very sharp angles with respect to the yarder without interference therefrom and also to permit the logs when in their loaded position to be entirely free of the yarder so as to avoid setting up undue stresses therein and also to permit free turning of the yarder there is provided an arrangement of struts extending from the reach frame to the boom and connected thereto in such a manner that the above desirable features are obtained without impairing the stability of the equipment or otherwise decreasing its efficiency and effectiveness.

To insure safeness for the operator of the tractor against the possibility of the yarder hitting standing trees and causing the same to fall over the tractor there is provided improved means associated with the yarder and so disposed with respect to its wheels that any trees in the path of movement will be caused to fall away from the tractor instead of falling thereon as is the case where the tractor wheels engage such trees.

Other objects and advantages will be more apparent to those skilled in the art from the following description of the accompanying drawings in which:

Fig. 2 is a plan view of Fig. 1, illustrating the yarder at substantially a right angle to the tractor, and Fig. 3 is a rear elevation of the yarder.

Fig. 4 is a view in plan of the forward part of the logging trailer and connection between the same and the tractor, the latter being omitted for the sake of clearness.

Figure 1:
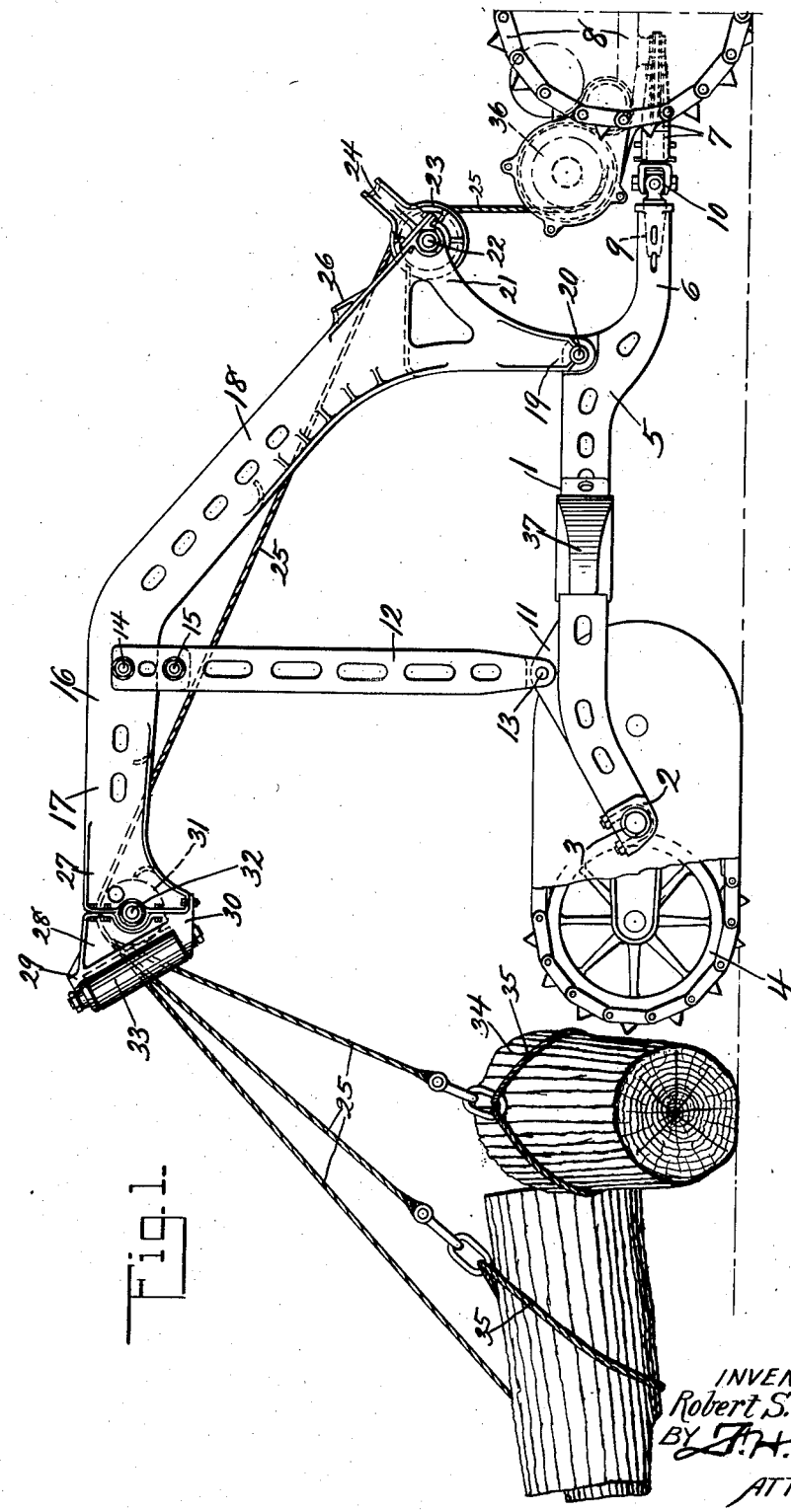
Fig. 1 is a side elevation of the improved yarder which is shown as attached to the rear end of a truck.

In the drawings there is shown, merely for the purpose of illustrating one specific embodiment which the invention may take, a reach frame generally indicated at 1, having a simple U-shaped portion whose legs extend slightly downwardly, Fig. 1, to terminate in suitable hubs 2, Fig. 2, for removably holding stationary stub shafts 3. These shafts are journaled in any usual manner in the frames of transversely spaced wheels 4 of relatively small height. These wheels are specifically shown as of the endless track type although a circular form of wheel may be employed if desired depending upon conditions of operation, but in either case the reach frame is disposed entirely on the inside of the wheels. A tongue 5 projects forwardly from the U-shaped portion and extends downwardly as at 6 for connection to a coupling generally indicated at 7. One end of this coupling is suitably rigidly secured to the frame of the tractor 8 while the other end is releasably connectable with the tongue as by a suitable wedge device 9, the two ends of the coupling having a universal connection 10. The reach frame is. like the other members to be described, preferably cast and preferably has a box cross section, the walls of which are provided with suitable openings both for the purpose of casting and of reducing the weight of the equipment.

An ear 11 projects upwardly from each leg of the substantially horizontal U-shaped portion of the reach frame, these ears being materially spaced forwardly of the central axle of the wheel units. A pair of transversely disposed inclined struts 12 have their lower ends bifurcated to receive the ears 11 these being pivotally connected by a bolt or other fastening 13. The upper end of these struts which are entirely identical throughout are preferably rigidly connected as by bolts 14 and 15 to a boom 16 it being noted that the upper ends of the struts engage the sides of the boom while preferably shoulders are also formed on the inside of the struts and upon which the lower surface of the boom rests. The upper bolt 14 preferably passes through the boom while the lower bolt 15 extends only through the struts.

The boom 16 has a substantially horizontal portion 17 and a diagonal portion 18 provided with a bifurcated end 19. This end receives an ear formed on tongue 5 and secured thereto as by a bolt or pivot member 20. Projecting forwardly from the boom is a bracket 21 carrying a shaft 22 upon which a sheave 23 is rotatably mounted. A suitable guard 24 extends over the sheave and is removably secured to the bifurcated portions of the bracket 21 as shown in Fig. 2. Inasmuch as the various frame members are hollow, advantage is taken of this to pass the cables 25 therethrough, suitable openings such as 26 being provided for this purpose. From the foregoing it is seen that the boom is rigidly connected to the struts to form a unit therewith, while this unit in turn has a three point suspension on the reach frame such as the pivot bolts 13 and 20 thereby reducing to a minimum the transmission or creation of torsional stresses in the yarder structure.

The outer end of the boom has a relatively large forked head 27 with which vertical and horizontal guide rollers are associated in an improved manner. For instance, there is bolted or otherwise removably secured to the head 27, a guide roller support having vertical side portions 28 cross-connected at its upper and lower ends as at 29 and 30 to form a single rigid unit. A horizontal roller 31 of relatively large diameter is journaled upon a shaft 32 which is secured in position between the adjacent faces of the guide roller bracket 28 and the boom head 27 while vertical and slightly inclined guide rollers 33 are journaled in brackets 28—30 rearwardly of roller 31, that is, to the left in Fig. 1. These vertical or lateral guide rollers 33 are sufficiently laterally spaced so as to maintain the cables in full operative engagement with the horizontal roller 31 irrespective of the angle from which a log, such as 34, may be pulled.

While the drawings show three logs connected to separate lines by their respective chokers 35, it will of course be understood that only one line may be employed although it is easier and preferable to utilize a number of lines thereby permitting bunching of logs from a number of different directions with one operation of the cable winding mechanism which is generally indicated at 36. The cable actuating mechanism is preferably of any usual clutch and brake controlled drum type such as is employed in this kind of work and is driven by power on the tractor although other suitable forms of cable operating mechanism may be employed. As the result of the winding mechanism the logs may be pulled together toward the yarder and finally by continuously pulling the cables the forward end of the logs will be raised from the ground and held in suspended hauling or transporting position beneath the outer end 17 of the boom.

Assuming that the logs are in their carrying or hauling position as beneath the boom it is readily seen that they hang entirely free from any possible contact with the yarder structure with the result that the yarder may assume, as shown in Fig. 3, a right angular relation to the bunched logs without the logs engaging the struts 12 or any portion of the boom 16, thus permitting a relatively sharp corner to be turned without inducing any abnormal stresses in the structural parts of the yarder. A further advantage of this improved arrangement is that logs may be pulled from a right angle lateral direction to a point directly beneath the boom without the necessity of changing the position of the yarder or of using manual labor in forcing the logs around structural parts of the yarder in order to permit them to pass such parts. Complete flexibility of the whole logging operation is obtained due to the ability of the tractor to assume an acute angular relation such as possibly a right angle or less with respect to the yarder, this being accomplished without any impairment of the operative relation of the cables with respect to the winding mechanism. Hence, it is possible to turn extremely sharp corners while the ability to freely draw the logs from a right angle direction is particularly useful where the condition of the ground or the presence of stumps or logs might be such as to require a non-alinement of the tractor and yarder.

To avoid having the wheels 4 engage standing trees and possibly cause the same to fall over the tractor and thus injure the operator there is provided means for causing such trees to fall away from the tractor. While this improved means is in or slightly above the horizontal plane of the wheels 4, still the action of this means is opposite to that which the wheels would have if they were allowed to push down trees in the path of movement. This means includes fenders 37 secured to each side of the U-frame of the reach 1, the outer edges of these fenders being curved so as to deflect either the tree or the yarder sidewise. It will be further noted that these fenders are provided with a series of holes 38 which in addition to reducing the weight thereof may also be used for any general utility purpose such as anchoring cables or ropes in order to perform any odd jobs that might be best served by such an anchoring device supplemented possibly by power movement of the tractor.

From the foregoing disclosure it is seen that there is provided a relatively simple construction which is relatively inexpensive, but which has a high degree of rigidity combined with maximum flexibility of operation.

It will of course be understood that various changes may be made in the construction and arrangement of parts without departing from the spirit of the appended claims.

What is claimed is:

1. A logging apparatus comprising, in combination, a power actuated tractor carrying cable actuating mechanism, a trailer having spaced wheels, a frame supported thereby and pivotally connected at its front end to said tractor, a rearwardly extending boom supported by said frame and having cable guiding means carried at the front and rear ends of the boom, and means for supporting said forward cable guiding means above said cable actuating means in such a manner that for any angular relation between the trailer and tractor a substantially constant relation is maintained between the cable actuating means and the cable leading from the boom thereto.

2. A logging apparatus comprising, in combination, a power actuated tractor carrying a cable winding mechanism, a trailer having spaced wheels, a frame supported thereby and pivotally connected at its front end to said tractor beneath said cable winding mechanism and with such relation to the rear end of the tractor whereby the trailer and tractor may assume a substantially right angle relation, a rearwardly extending boom supported by said frame and having cable guiding means carried at the front and rear ends of the boom, and means for supporting said forward guiding means above said cable winding means in such a manner that for any angular relation between the trailer and tractor a substantially constant relation is maintained between the cable actuating means and the cable leading from the boom thereto, whereby a line leading from said winding mechanism and over said rear guiding means may carry the front end of a log or logs in raised hauling position and permit the trailer to turn at substantially right angles relative to the trailing log or logs and be entirely free thereof.

3. A logging trailer comprising, in combination, transversely spaced wheels, a frame carried therebetween and extending forwardly thereof for attachment to a tractor, a rearwardly extending boom having a line leading over the rear end thereof to draw in a log or logs and raise the same into hauling position below the boom, and means including upright struts for supporting said boom on said frame at three points of contact intermediate the ends thereof, one of which points is at the forward end of said frame and the other two rearwardly thereof, said boom supporting means being so arranged that the boom projects rearwardly to permit logs to be normally carried thereunder and extend either rearwardly or in sharply lateral directions freely of the boom supporting means and frame, whereby the trailer may turn at substantially right angles to the log or logs carried thereby without interference therefrom.

4. A logging trailer comprising, in combination, transversely spaced wheels, a substantially horizontal reach frame having a substantially U-shaped portion whose legs are connected to said wheels, a tongue projecting forwardly from said U-shaped portion for attachment to a tractor, a rearwardly extending boom pivotally supported at its front end to said reach frame adjacent said tongue, a pair of laterally extending struts secured to said boom at an intermediate point thereof, and means for pivotally supporting the lower ends of said struts on said reach frame whereby the boom provides an entirely clear space rearwardly and laterally of its end and a clear space for a substantial distance forwardly thereof, and a line leading over the rear end of said boom adapted to draw material from lateral or rearward directions to said trailer without any obstruction from said struts and then lift the material into hauling position thus permitting the trailer to turn at substantially right angles with respect to the log while being free thereof.

5. A logging trailer comprising, in combination, transversely spaced wheels, a frame carried thereby and adapted for attachment to a tractor, a rearwardly extending boom supported on said frame, a line leading over the rear end of said boom to draw in a log and support the same in a raised hauling position below the boom, and shearing devices carried by said frame to the front of said wheels whereby standing trees will be either sheared away from the tractor which is pulling the trailer or the tree will cause the trailer to be sheared laterally and permit passing of the trailer.

6. A logging trailer comprising, in combination, transversely spaced wheels, a substantially U-shaped frame having its legs carried by said wheels, a tongue projecting forwardly from the U-shaped portion for attachment to a tractor, and shearing members carried by and extending laterally from the U-shaped portion in front of said wheels, said members having a rearwardly inclined forward edge which terminates in a free end.

7. In a logging apparatus, in combination, a tractor having cable actuating mechanism and a logging trailer comprising spaced wheels, a reach frame supported by said spaced wheels and pivotally connected at its forward end to the tractor, a boom supported by the reach frame, and cable guiding means at the front and rear ends of said boom.

8. In a logging apparatus, in combination, a tractor having cable actuating mechanism and a logging trailer comprising spaced wheels, a reach frame supported by said spaced wheels and pivotally connected at its forward end to the tractor, a boom supported by the reach frame, and cable guiding means at the front and rear ends of said boom, the rear cable guiding means having longitudinal and lateral guides located substantially over the space between said wheels at the rear of the reach frame.

9. In a logging apparatus, in combination, a tractor having cable actuating mechanism and a logging trailer comprising spaced wheels, a reach frame supported by said spaced wheels and pivotally connected at its forward end to the tractor, a boom supported by the reach frame, and cable guiding means at the front and rear ends of said boom, the rear cable guiding means having longitudinal and lateral guides located substantially over the space between said wheels at the rear of the reach frame, the front cable guiding means being substantially above the said cable actuating mechanism, and the said pivotal connection being substantially in vertical alinement with the cable actuating mechanism.

10. In a material moving apparatus, the combination of a power actuated tractor carrying cable winding mechanism, a trailer comprising transversely spaced wheels, a frame supported therebetween and pivotally connected at its front end to said tractor, a boom mounted on and connected at its front end to said frame and carrying front and rear cable guiding means thereon, boom supporting means comprising upright struts interposed between said frame and boom whereby a line leading from said winding mechanism over said guiding means may draw a laterally or rearwardly remote load and suspend it in raised hauling position beneath said boom in such a manner that said load may extend at substantially right angles from said trailer while being entirely free thereof.

11. In a material moving apparatus, the combination of a power actuated tractor carrying cable winding mechanism, a trailer comprising transversely spaced wheels, a frame supported therebetween and pivotally connected to said tractor, a boom connected at its front end to said frame intermediate the ends of the latter and inclined upwardly so that its rear end is materially vertically spaced from said frame, upright struts for supporting said boom on said frame, and cable guiding means carried by the front and rear ends of said boom whereby lines leading from said winding mechanism over said guiding means may be pulled out in various directions, connected with material remote from the boom, and then drawn in to lift said material into load hauling relation with and entirely free of said trailer, and in such a manner that the stresses of the load are transmitted vertically downward to said frame at points intermediate the ends thereof.

12. A material moving trailer adapted for attachment to a tractor comprising transversely spaced wheels, a U-shaped reach frame carried therebetween and having a tongue projecting forwardly therefrom, a boom connected at its front end intermediate the ends of said frame and inclined upwardly so that its rear end is materially vertically spaced from said frame and terminates substantially in vertical alinement with the rearmost portions of said wheels, and upright struts interposed between the legs of said frame and said boom for supporting the latter on said frame, guiding means on the front and rear ends of said boom, and a line leading over said guiding means adapted to draw material from any point rearward of said trailer and suspend it unobstructed in hauling position beneath said boom in such a manner as to permit said trailer to freely turn at substantially right angles.

13. A logging trailer comprising, in combination, transversely spaced wheels, a frame carried therebetween and adapted for attachment to a tractor, a rearwardly, upwardly inclined boom pivoted at its front end intermediate the ends of said frame and having guiding means thereon, and upright struts supporting said boom on said frame in such a manner that a line leading over said guiding means may draw in a log and suspend it free of said struts below said boom whereby to permit said trailer to turn at substantially right angles to the trailing log carried thereby without obstruction therefrom.

14. A logging trailer comprising, in combination, transversely spaced wheels, a frame carried therebetween and adapted for attachment to a tractor, a rearwardly inclined boom mounted on said frame, and upright struts connected intermediate the ends of said frame and supporting said boom in such a manner that the rear end thereof is unobstructed therearound whereby a line leading over and down from said rear end may so support one end of a log in raised hauling position as to permit the trailer to turn at substantially right angles relative to the trailing log while being entirely free thereof.

ROBT. S. LANGDON.